United States Patent
Paolo

[19]

[11] Patent Number: 6,032,442
[45] Date of Patent: Mar. 7, 2000

[54] LANDSCAPING TRIMMER ATTACHMENT

[76] Inventor: David A. Paolo, 1903 Magdalene Manor Dr., Tampa, Fla. 33613

[21] Appl. No.: 08/970,746

[22] Filed: Nov. 15, 1997

Related U.S. Application Data

[63] Continuation-in-part of application No. 08/566,989, Dec. 4, 1995, abandoned.

[51] Int. Cl.$^7$ .................................................. A01D 55/00
[52] U.S. Cl. .............................. 56/12.7; 56/13.6; 30/276; 172/13; 172/15; 172/25
[58] Field of Search .................................... 56/12.7, 13.6; 172/13, 15, 17, 25, 16; 30/276

[56] References Cited

U.S. PATENT DOCUMENTS

| | | |
|---|---|---|
| 3,150,720 | 9/1964 | Harnett . |
| 4,062,115 | 12/1977 | Lee . |
| 4,213,504 | 7/1980 | Schneider . |
| 4,238,866 | 12/1980 | Taylor . |
| 4,509,701 | 4/1985 | Jack et al. . |
| 4,685,279 | 8/1987 | Gullett . |
| 4,860,451 | 8/1989 | Pilatowicz et al. . |

Primary Examiner—H. Shackelford
Attorney, Agent, or Firm—Pettis & Van Royen, P.A.

[57] ABSTRACT

An attachment for a landscaping trimmer for use in precise trimming and edging of landscaped areas. The attachment has bores through an elongated body member which are adjacent to the free end of the body member and perpendicular to its axis. Pre-cut pieces of trimming line are secured through the bores by at least one screw positioned against the portions of the pre-cut pieces which are centrally located within the body member. Integral with the body member and on Its free end, the present invention may have a spacer for lawn cutting, or pointed bits with various surface configurations to perform functions including, but not limited to, "drilling out" weeds and unwanted grass in and around planters, flower pots and flower boxes, as well as tearing out unwanted roots near the surface of the soil. Connection of the body member to a landscaping trimmer may be accomplished through an internally threaded cavity within the body member, an externally threaded male member integral with the body member, a non-hinged bracket which is attached to the body member and has an opening through its upper surface, or a hinged bracket with a central bore which communicates with a non-threaded cavity in the body member. Applications of the present invention may include, but are not limited to, attachment to most of the currently existing models of gasoline powered landscaping trimmers.

17 Claims, 4 Drawing Sheets

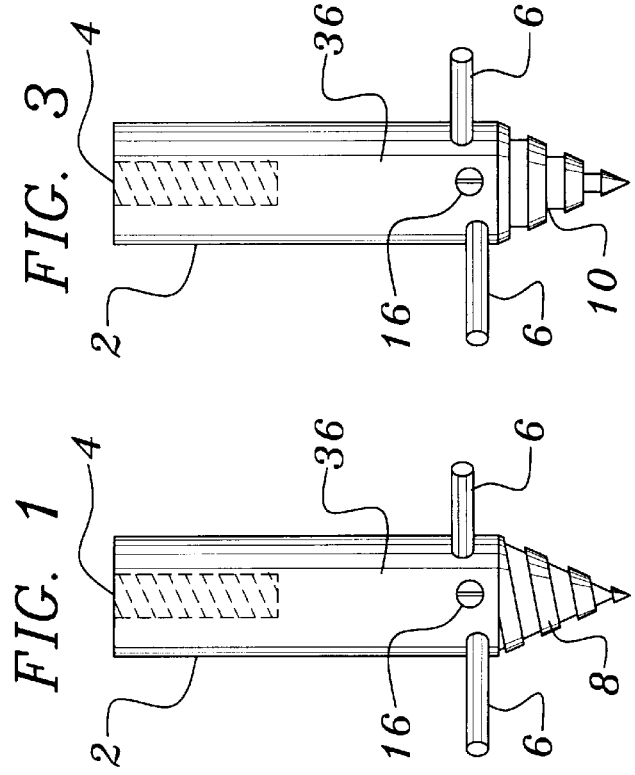

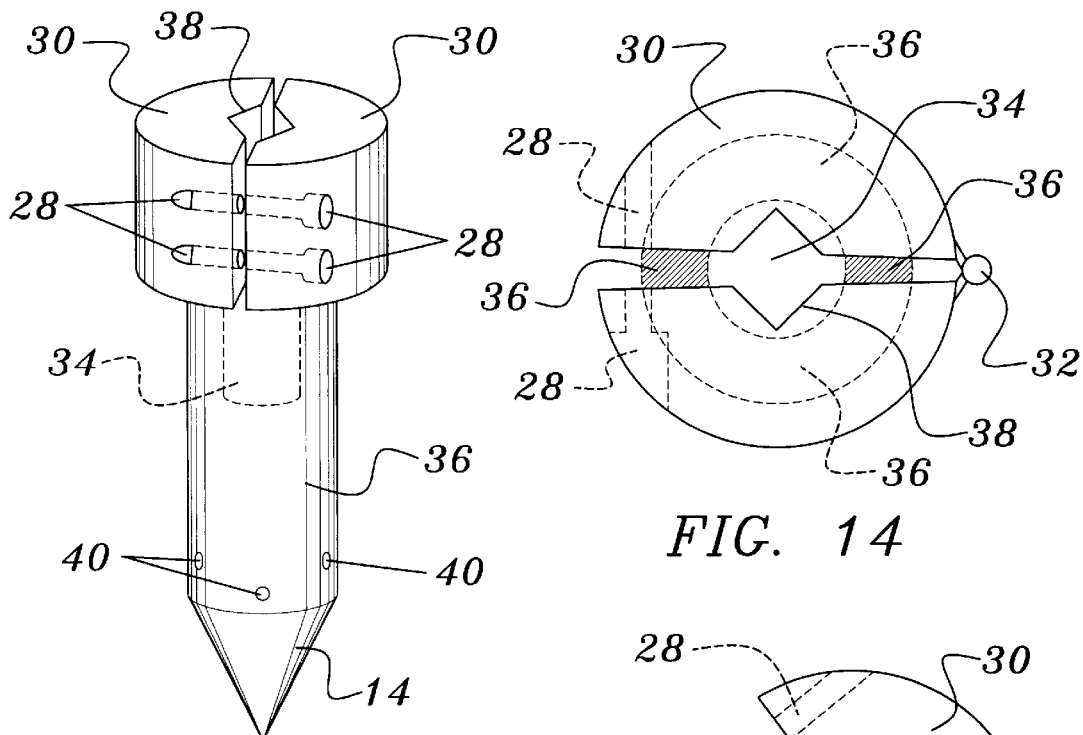
FIG. 13
FIG. 14
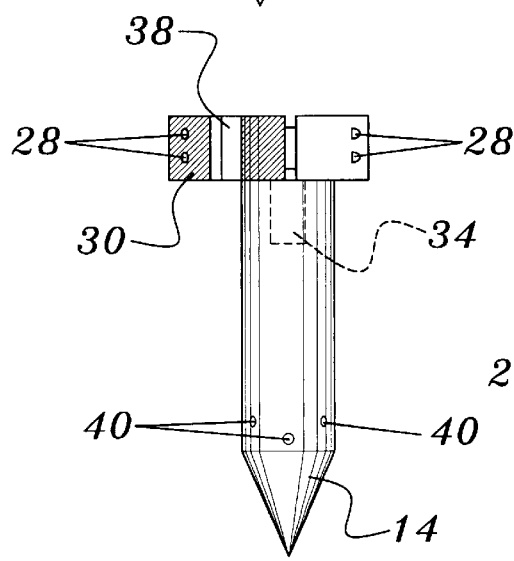
FIG. 15
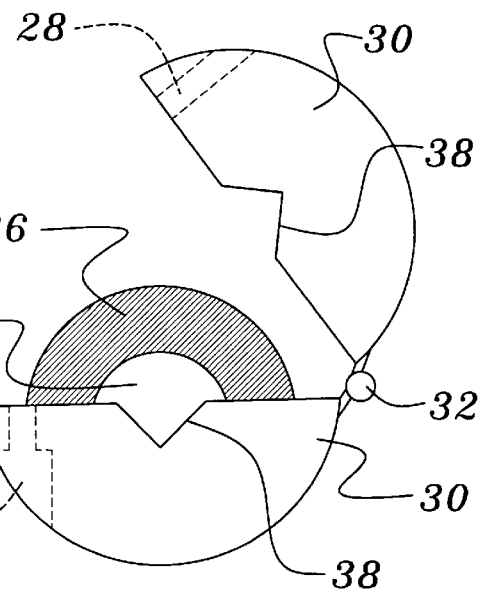
FIG. 16

LANDSCAPING TRIMMER ATTACHMENT

This application is a Continuation-in-part of U.S. patent application Ser. No. 08/566,989 filed Dec. 4, 1995 now abandoned. The invention disclosed in this application has been previously disclosed in part to the U.S. Patent and Trademark Office in Disclosure Documents DD 346846, received Jan. 27, 1994 and DD 358449, received Jul. 18, 1994.

BACKGROUND—FIELD OF INVENTION

This invention relates to landscaping trimmer attachments, specifically to an attachment having bores through an elongated body member which are adjacent to the free end of the body member and perpendicular to Its axis, through which pre-cut pieces of trimming line are secured for use in precise trimming and edging of landscaped areas. The free end of the present invention may also taper to a point and have various surface configurations for use in landscaping activities such as removing weeds and unwanted grass in and around planters, in flower pots and in flower boxes, in rock gardens, as well as tearing out unwanted roots near the surface of the soil. Applications of the present invention include, but are not limited to, attachment to most of the currently existing models of gasoline, and certain electric, powered landscaping trimmers.

BACKGROUND—DESCRIPTION OF PRIOR ART

Landscaping trimmers which use monofilament line are commonly used to cut grass and weeds in areas where it is impractical to use a lawn mower. They are particularly useful in edging around trees, near fences and walls, and along borders of landscaped areas. Conventional landscaping trimmers have elongated shafts with a rotating-element on their near-ground ends for attachment of a spool by tapping the bottom of the spool against the ground. When depressed against the ground, a button on the bottom of the spool releases the monofilament line and allows additional monofilament line to become available for use. The rotating spool may be replaced by other attachments, such as those having rigid blades, to suit changing landscaping needs.

Landscaping trimmers having spools of monofilament line are useful tools, but there are disadvantages to their use. One disadvantage Is that the monofilament line occasionally tends to bind, jam, break, and refuse to feed automatically from the spool. When this happens the trimmer must be turned off and examined for a determination of the cause of the malfunction. This occurrence is frustrating for the user and delays the trimming process. Another disadvantage of landscaping trimmers having spools of monofilament line is the lack of precision cutting by a user, even by an experienced user. People using such landscaping trimmers frequently cut into plants, trees, walls, landscaping trim, and fences. Part of the reason for this nonprecision in cutting is the constantly changing length of the monofilament line in use. As the monofilament line is worn down, and as more line is periodically extended by tapping rotating spool on the ground, the exact amount of monofilament line extended becomes unpredictable. The rate of wear for the exposed monofilament line depends on the type of vegetation cut and the number of times the user has inadvertently cut into a fence or a wall. Also, the amount of new monofilament line extended from the spool each time it is tapped on the ground depends upon the number of times the spool is tapped on the ground, and the possibility of the monofilament line binding and jamming within the spool. As a result, when edging around a garden, a tree, or a landscaped area, a user is not always able to correctly anticipate the current cutting radius of the landscaping trimmer. Consequently, the user will occasionally cut into objects such as fences, tree trunks, and plants which were not intended to cut. Another disadvantage is that the extended length of the monofilament line must be periodically examined during use, for if it wears down too rapidly leaving no exposed segment of monofilament line extending beyond the edge of the spool, the user will have to spend time to take the spool apart to re-extend the monofilament line for further use. Also, during high speed operation heat build up is known to cause monofilament line in spools to melt at overlap points. Monofilament line weakened by melting tends to break, requiring an operator to have to stop trimming, remove a cover, and rethread the monofilament line.

It is not known in this field to have an attachment for a landscaping trimmer which uses pre-cut lengths of monofilament line for precise cutting and edging and which may also have a pointed end with various surface configurations for use in landscaping activities such as digging into the soil for removing weeds and unwanted grass in planters, in flower pots and in flower boxes, in rock gardens, as well as tearing out unwanted roots near the surface of the soil.

SUMMARY OF INVENTION—OBJECTS AND ADVANTAGES

It is the primary object of this invention to provide an attachment for a landscaping trimmer that will allow increased precision in the trimming and edging of landscaped areas.

It is also and object of this invention to provide an attachment for a landscaping trimmer that will eliminate the jamming and binding of monofilament line a user may experience with a spool-type landscaping trimmer attachment.

It is also an object of this invention to provide an attachment for a landscaping trimmer which has available for use a predictable amount of trimming line.

A further object of this invention is to provide a means to eliminate weeds and unwanted grass without the use of chemicals by digging into the soil and pulling the weeds out by the roots.

It is also an object of this invention to provide a means by which a user may eliminate weeds and unwanted grass without having to bend over to reach them.

A further object of this invention is to provide an attachment for a landscaping trimmer that will attach to most of the currently existing models of landscaping trimmers.

It is also an object of this invention to provide an attachment for a landscaping trimmer that is made of solid construction and is designed to last for years when properly stored and maintained.

As described herein, properly manufactured and installed on a landscaping trimmer, the present invention would provide an attachment for a landscaping trimmer that would allow more focused trimming an edging than is possible with a spool-type attachment. Since the present invention uses pre-cut sections of trimming line, short lengths of trimming line may be attached which permit damage-free trimming near sprinkler heads, fences, and in flower pots. Because the pre-cut lengths of trimming line do not feed from a spool, the present invention eliminates the jamming and binding problems associated with a spool-type landscaping trimmer attachment and conserves trimming line. The present invention may have a pointed end to remove weeds and unwanted grass without the use of chemicals and without the user having to bend over to reach the weeds and unwanted grass. The present invention is designed for attachment to most of the currently existing models of landscaping trimmer s and is made of solid steel, or polypropylene plastic, construction that is designed for long-term use when properly stored and maintained.

The description herein provides preferred embodiments of the present invention but should not be construed as limiting the scope of the landscaping trimmer attachment invention. Variations in the length of the body member, the taper of the pointed end, the surface configuration of the pointed end, the number of screws used to secure the pre-cut pieces of trimming line within the body, and the means of securing a hinged bracket to attach the body of the present invention to a landscaping trimmer, other than those shown and described herein, can be incorporated into the present invention. Thus the scope of the present invention should be determined by the appended claims and their legal equivalents, rather than the examples given.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a side view of a first embodiment of the Invention having an internally threaded cavity on one end for attachment to a landscaping trimmer and a screw-type bit on its opposite end.

FIG. 2 is a bottom view of the first embodiment of the invention.

FIG. 3 is a side view of a second embodiment of the Invention having an internally threaded cavity on one end for attachment to a landscaping trimmer and a bit with a tiered configuration on its opposite end.

FIG. 4 is a bottom view of the second embodiment of the invention.

FIG. 5 is a side view of a third embodiment of the invention having an internally threaded cavity on one end for attachment to a landscaping trimmer and a bit with a serrated configuration on its opposite end.

FIG. 6 is a bottom view of the third embodiment of the Invention.

FIG. 7 is a side view of a fourth embodiment of the invention having an internally threaded cavity on one end for attachment to a landscaping trimmer and a bit with a smooth surface on its opposite end.

FIG. 8 is a bottom view of the fourth embodiment of the invention.

FIG. 13 is an isometric view of an eighth embodiment of the invention having a hinged bracket and a non-threaded cavity for connection with a landscaping trimmer.

FIG. 14 is a top view of the eighth embodiment of the invention showing the hinged bracket in a closed position.

FIG. 15 is a side view of the eighth embodiment of the invention showing the hinged bracket in an opened position.

FIG. 16 is a top view of the eighth embodiment of the invention showing the hinged bracket in an opened position.

DETAILED DESCRIPTION OF PREFERRED EMBODIMENTS

Figure 10:
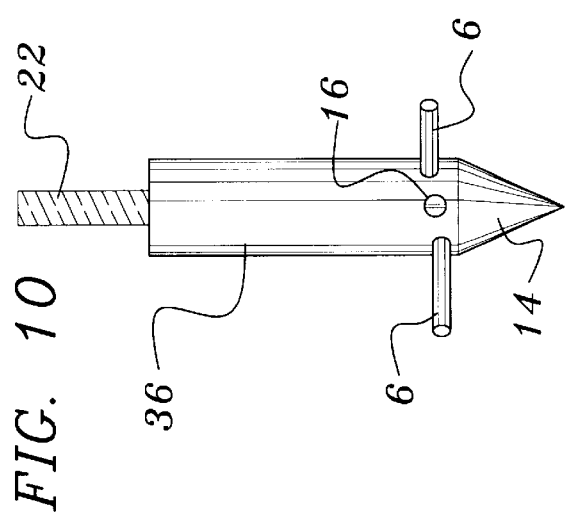
FIG. 10 is a side view of a sixth embodiment of the invention having an externally threaded male connection for attachment to a landscaping trimmer.

FIGS. 1 and 2 show a first embodiment of landscaping trimmer attachment invention 2 having a body member 36 with an internally threaded cavity 4 centrally located on-a first end of body member 36 and a screw-type bit 8 on the second end of body member 36 remote from a user. Although in the preferred embodiments shown in FIGS. 1 and 2, body member 36 has a cylindrical shape, the cylindrical shape is not critical to the present invention. It is contemplated for body member 36 to be elongated with a variety of cross-sectional configurations including, but not limited to, that of a square, hexagon, octagon and dodecagon. Attached to and extending through body member 36, adjacent to the end of body member 36 having screw-type bit 8, are pre-cut sections of trimming line 6. Trimming line 6 is secured to body member 36 with a screw 16, although other means may be used for securing the trimming line to the body member. In the preferred embodiment screw 16 is a five-sixteenths inch fine thread set screw with a slotted head. FIGS. 3 and 4 show a similar second embodiment of landscaping trimmer attachment invention 2 with body member 36 having a tiered bit 10 on the second end of body member 36 remote from a user. FIGS. 5 and 6 show a third embodiment of landscaping trimmer attachment invention 2, similar to the first and second embodiments, with body member 36 having a serrated bit 12 on the end of body member 36 remote form a user. FIGS. 7 and 8 show a similar fourth embodiment of landscaping trimmer attachment invention 2 with body member 36 having a smooth bit 14 on the end of body member 36 remote form a user.

Figure 9:
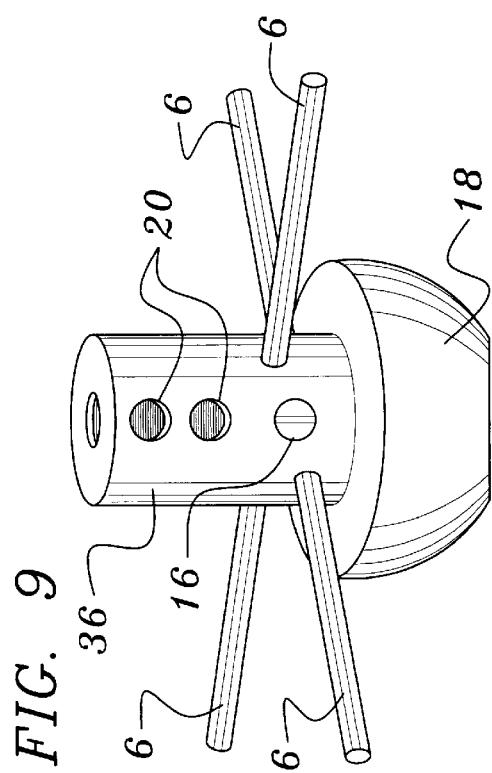
FIG. 9 is an isometric view of a fifth embodiment of the invention having a spacer for lawn cutting on its free end.

FIG. 9 shows a fifth embodiment of landscaping trimmer attachment invention 2 having a spacer 18 for lawn cutting attached to the end of body member 36 remote from a user. Although the material from which spacer 18 is made is not critical to landscaping trimmer attachment invention 2, in the preferred embodiment spacer 18 is made of solid plastic. It is contemplated for spacer 18 to be molded during construction to body member 36, or attached to body member 36 by screw 16 which also secures pre-cut section of trimming line 6 to body member 36. In this fifth embodiment, body member 36 also has height adjustment holes 20.

FIG. 10 is a side view of a sixth embodiment of landscaping trimmer attachment invention 2, similar to the embodiments shown in FIGS. 1, 2, 3, and 4, having an externally threaded male end 22 for connection to a conventional landscaping trimmer (not shown). Although the sixth embodiment shows smooth bit 14 attached to body member 36, it is also contemplated for the sixth embodiment to have screw-type bit 8, tiered bit 10, or serrated bit 12 positioned on body member 36 in lieu of smooth bit 14.

Figure 12:
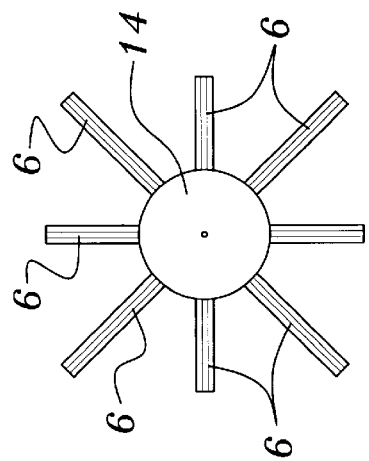
FIG. 12 is a cross-sectional view of the invention showing the manner in which the pre-cut pieces of trimming line are secured to the body of the invention.
Figure 11:
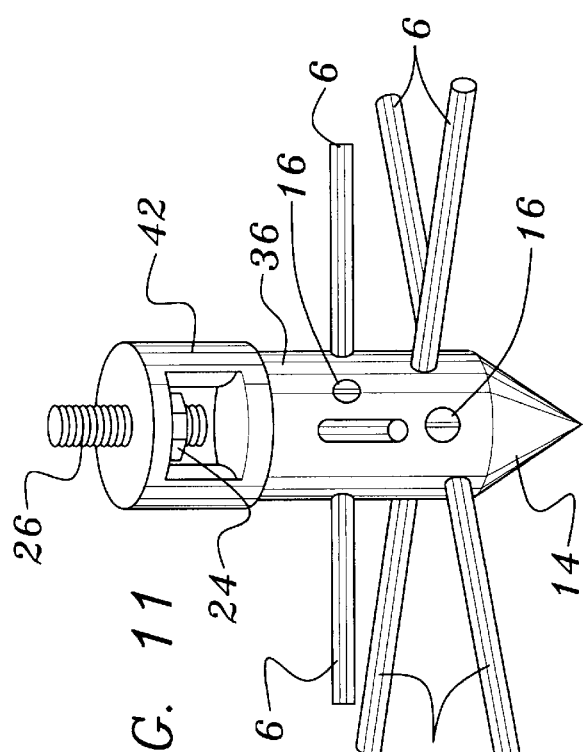
FIG. 11 is an Isometric view of a seventh embodiment of the invention having a non-hinged bracket with an internally threaded opening through its upper surface for connection to an externally threaded male connection of a landscaping trimmer.

FIG. 11 shows a seventh embodiment of landscaping trimmer attachment invention 2 having a non-hinged bracket 42 attached to body member 36. Non-hinged bracket 42 has an internally threaded opening through its upper surface for connection to a landscaping trimmer male connection 26. A nut 24 secures landscaping trimmer male connection 26 to non-hinged bracket 42. FIGS. 11 and 12 show the manner in which pre-cut pieces of line 6 are secured to body member 36 with screw 16 and that it is contemplated for non-hinged bracket 42 to have more than one layer of pre-cut pieces of line 6 in use at one time.

FIGS. 13, 14, 15, and 16 show an eighth embodiment of landscaping trimmer attachment invention 2 having a hinged bracket 30 and a non-threaded cavity 34 for connection to a non-threaded landscaping trimmer male connection (not shown). Although in the preferred embodiments shown in FIGS. 13, 14 and 16, hinged bracket 30 has a cylindrical shape, the cylindrical shape is not critical to the present invention. It is contemplated for hinged bracket 30 to have a variety of cross-sectional configurations, including but not limited to that of a square, hexagon, octagon, and dodecagon. FIG. 13 shows hinged bracket 30 secured in a closed in a closed position by bolts 28, however, it is contemplated to have any secure means of closing hinged bracket 30. Cutout portions 38 in the upper surface of hinged bracket 30 communicate with non-threaded cavity 34. FIG. 13 also shows bore 40 through the end of body member 36 remote from a user to receive pre-cut pieces of trimming line 6. FIGS. 14 and 15 show a hinge 32 located on the outer perimeter of hinged bracket 30, in a position opposed from bolts 28. FIG. 16 shows hinged bracket 30 in an opened position.

Figure 17:
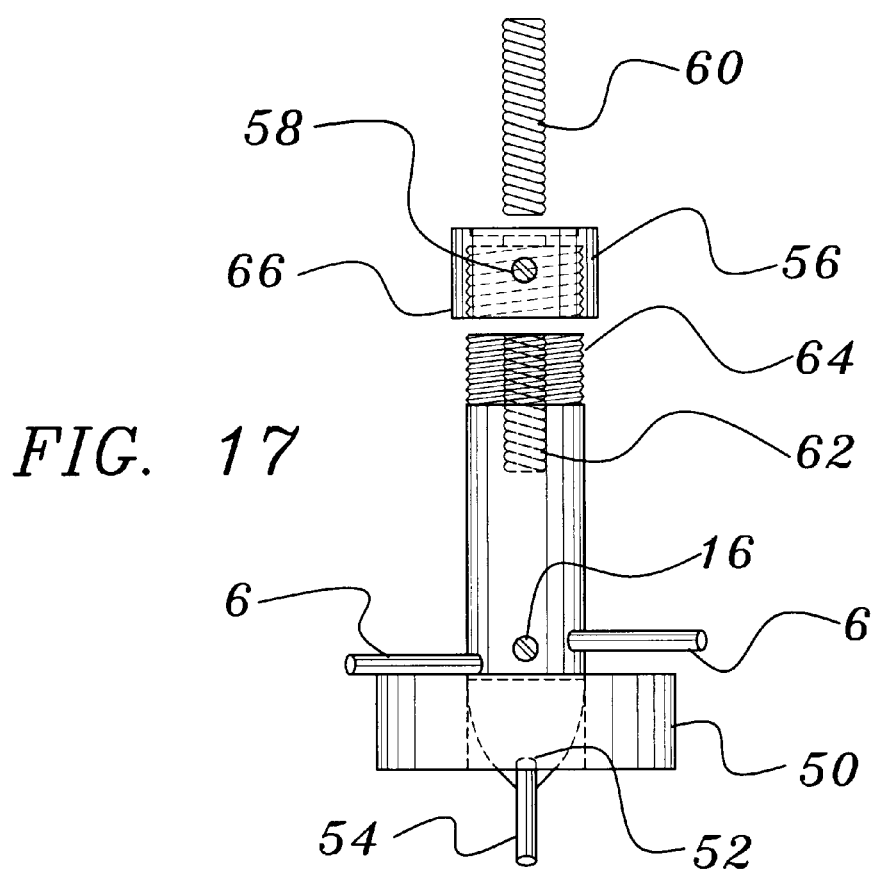
FIG. 17 is a side view of an alternate embodiment of the invention showing the tapered bit member having a bore therethrough for holding a short segment of trimming line, a spacer directly adjacent the tapered bit member, a cylindrical cap member and a threaded stud.
Figure 18:
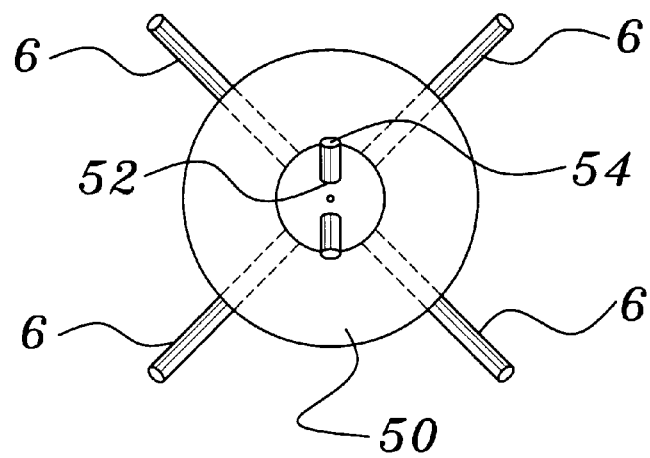
FIG. 18 is a bottom view of the alternate embodiment shown in FIG. 17.

FIG. 17 shows a ninth embodiment of the present invention wherein the tapered end includes a bore 52 therethrough for receiving a short segment of trimming line 54. A spacing ring 50 is positioned between the bores located on the shaft of the attachment and the tapered end bore 52. The lower portion of the spacing ring is positioned directly adjacent the tapered end bore 52, so that when the short segment of trimming line 54 is positioned through the bore 52, both ends of the trimming line are forced downwardly toward the tapered end by the spacing ring 50. The non-tapered end is an externally threaded male end 64 having an internally threaded cavity 62 positioned axially thereon. The internally threaded cavity may be tapered, so that it may receive threaded male ends of trimmers of varying sizes. Some weed trimmers have a female end, so it is contemplated to use a threaded stud 60 which will screw into the female end of the trimmer, and will also screw Into the internally threaded cavity of the attachment for securement thereto. When the attachment is connected to the trimmer using the internal threads, a cylindrical cap member 56 is used therewith. The cylindrical cap member contains an internally threaded cavity 66 for receiving the external threads of the shaft 64. The cylindrical cap member also defines an axially positioned hole for receiving the male threaded end of a trimmer, where the threaded trimmer shaft passes through the axial hole in the cylindrical member, and is engaged with the threads located on the inner cavity of the attachment. As shown In FIG. 17, the cylindrical cap member may be secured to the shaft member by a screw 58 tightened through a threaded hole in the cylindrical cap member against the shaft. The cylindrical cap member also serves as a stabilizer for the attachment by preventing uneven oscillations of the attachment and ensuring that the attachment is axially secured to the trimmer without being biased in any radial direction.

This embodiment of the invention is used for weeding. The user simply positions the spinning tapered end adjacent a weed on the ground, and the short segment of trimming line digs into the soil, grips the weed and pulls it out of the ground, including most of the roots. The trimming line positioned through the bores in the shaft above the spacing ring serves to fan away the weed and fragments that have just been uprooted. The spacing ring allows the weed to become uprooted without being cut by the longer trimming line portions positioned through the bores in the shaft.

It is contemplated for body member 36 to be made of solid construction. In the preferred embodiment, body member 36 is made of steel, although construction of polypropylene plastic is also contemplated. Further, although the size of line trimmer attachment invention 2 is not critical to the present invention, it is contemplated in the preferred embodiment for line trimmer attachment invention to be approximately three inches in length and three-fourths inches in diameter. When dried after each use and properly stored, it is contemplated for landscaping trimmer attachment invention 2 to last for years. Although the material from which trimming line 6 is made is not critical to landscaping trimmer attachment invention 2, it must be flexible, strong and durable so that it may perform its cutting function. It is contemplated for trimming line 6 to be made of materials such as monofilament line and flexible steel line. Trimming line 6 may have a round cross-section, or another cross-section, such as a star-shaped cross-section. Trimming line 6 may also have a diameter in the range from 0.065 inches through 0.155 inches. In the preferred embodiment trimming line 6 is made of monofilament line having a 0.130 inch diameter and a star-shaped cross-section for high wear and low breakage. Also, the free end of the preferred embodiment is approximately three-fourths inches long, tapered to an approximately sixty degree angle, and has the configuration of screw-type bit 8.

To use landscaping trimmer attachment invention 2 on a landscaping trimmer, the original head of the landscaping trimmer (not shown) must be removed. Landscaping trimmer attachment invention 2 may then be attached to the exposed end of the landscaping trimmer with a properly sized wrench or pliers. Pieces of trimming line 6 must then be cut which are between ⅝ inches and 12 inches in length, depending upon the intended use, and placed through bores 40. Trimming line 6 cut between ⅝ inches and ¾ inches in length may be used for single weeding and weeding in flower pots. Trimming line 6 cut between 2 inches and 3 inches in length my be used for trimming in flower beds and in other tight places. Trimming line 6 cut between 5 inches and 6 inches in length may be use for trimming around sprinkler heads and near plants and fences. Trimming line 6 cut between 10 and 12 inches in length may be used for edging and trimming in open spaces. Trimming line 6 more than 12 inches in length is not used as it tends to wrap around body member 36 during use. More than one pre-cut piece of trimming line 6 may be placed through each bore 40. Single line installation may be used for high, thick grass and on low power landscaping trimmers (not shown). In situations where high wear of trimming line 6 is expected, dual line installation may be used with two pre-cut pieces ranging between 6 inches and 9 inches in length placed into each bore. Trimming line 6 ranging between 0.065 inches and 0.080 inches in diameter may be used for dual line installation. After pieces of trimming line 6 are cut and inserted into bores 40 in body member 36, screw 16 is then tightened firmly within body member 36 to intersect and hold trimming line 6 in place within bores 40 during use, however, care must be taken so as not to set screw 16 too tightly against trimming line 6 to crush and weaken it. As body member 36 rotates, trimming line 6 is able to be used for cutting and edging functions. Screw-type bit 8, tiered bit 10, serrated bit 12, the bit containing the bore and short segment of trimming line, and smooth bit 14 may be used as a drill to remove weeds or as a guide for obtaining a sharp, straight edge around landscaped areas. To remove weeds, body member-36 is placed above and slightly in front of a weed (not shown). A quick downward motion penetrating approximately one inch into the soil will drill out a weed and most of its roots. Pieces of the weed and its roots are fanned away by the air circulation caused as a result of the rotation of trimming line 6. Covering the one inch hole in a lawn is usually not necessary as the hole aerates the soil. Landscaping trimmer attachment invention 2 may be used to simulate the action of a rototiller for uses such as turning over the soil for a garden.

While a preferred embodiment of the invention has been described using specific terms, such description is for illustrative purposes only, and it is to be understood that changes and variations may be made without departing from the spirit or scope of the following claims.

What is claimed is:

1. An attachment for a landscaping trimmer comprising:
   a solid body member having a first end and a second end, said body member having a plurality of bores therethrough adjacent said second end;
   a plurality of pre-cut pieces of flexible trimming line, each of said pre-cut pieces having a diameter slightly smaller than said bores and at least one of said pre-cut pieces being inserted through one of said bores;
   a tapered bit member integral with said second end, said tapered bit member including a bore for receiving a segment of flexible trimming line;
   securing means for securing at least one of said pre-cut pieces of flexible trimming line within said bores during use; and
   connection means for connecting said first end of said body member to said landscaping trimmer so that said pre-cut pieces of flexible trimming line may be used for precise trimming and edging of landscaped areas.

2. The attachment of claim 1, further comprising spacing means positioned on said body member between said bores through said body and said bores through said tapered bit member.

3. The attachment of claim 1 wherein said pre-cut pieces of flexible trimming line comprises trimming line having a diameter not less than 0.065 inches and not more than 0.155 inches.

4. The attachment of claim 1 wherein said connection means comprises an internally threaded cavity on said first end.

5. The attachment of claim 4, further including a threaded stud for securement into a female end of said trimmer and for securement into said internally threaded cavity on said first end.

6. The attachment of claim 1 further comprising an internally threaded cavity on said first end and an externally threaded male member integral with said body member on said first end.

7. The attachment of claim 6, further comprising a cylindrical cap member having an inner threaded cavity and defining a hole positioned axially therethrough, said cylindrical cap member being used to engage said external threads of said first end.

8. The attachment of claim 7, wherein said cylindrical cap member includes a threaded hole defined radially therein, and a screw engaged within said threaded hole for securing said cylindrical cap member against said body member.

9. The attachment of claim 1 wherein said connection means comprises a non-hinged bracket integral with said first end of said body member, said non-hinged bracket having a surface remote from said body member and an internally threaded opening on said remote surface.

10. The attachment of claim 1 further comprising said body member having an internally threaded opening communicating with said bores and an externally threaded screw which, when positioned within said internally threaded opening and tightly secured against said pre-cut pieces of flexible trimming line within said bores, holds each of said pre-cut pieces within said bores during use.

11. An attachment for a landscaping trimmer comprising:
    a solid body member having a first end, a second end and a longitudinal axis, said body member having a plurality of bores therethrough adjacent said second end, each of said bores being perpendicular to said longitudinal axis,
    a plurality of pre-cut pieces of flexible trimming line, each of said pre-cut pieces having a diameter slightly smaller than said bores and at least one of said pre-cut pieces being inserted through one of said bores;
    a tapered bit member integral with said second end, said tapered bit member including a bore for receiving a segment of flexible trimming line; and
    connection means for connecting said first end of said body member to said landscaping trimmer so that said pre-cut pieces of flexible trimming line may be used for precise trimming and edging of landscaped areas.

12. The attachment of claim 11 wherein said connection means comprises an internally threaded cavity on said first end.

13. The attachment of claim 12, further including a threaded stud for securement into a female end of said trimmer and for securement into said internally threaded cavity on said first end.

14. The attachment of claim 11 herein said connection means comprises a non-hinged bracket integral with said first end of said body member, said non-hinged bracket having a surface remote from said body member and an internally threaded opening on said remote surface.

15. The attachment of claim 11 further comprising an internally threaded cavity on said first end and an externally threaded male member integral with said body member on said first end.

16. The attachment of claim 15, further comprising a cylindrical cap member having an inner threaded cavity and defining a hole positioned axially therethrough, said cylindrical cap member being used to engage said external threads of said first end.

17. The attachment of claim 11, further comprising spacing means positioned on said body member between said bores through said body and said bores through said tapered bit member.

* * * * *